United States Patent
Zhao et al.

(10) Patent No.: US 6,937,442 B2
(45) Date of Patent: Aug. 30, 2005

(54) CONTACTING POINT DAMPING METHOD BETWEEN FLEX CIRCUIT AND PIVOT HOUSING

(75) Inventors: (Leon) Liyang Zhao, Maple Grove, MN (US); (Peter) Fei Wang, Savage, MN (US); Kenneth A. Haapala, Robbinsdale, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 149 days.

(21) Appl. No.: 10/175,969

(22) Filed: Jun. 20, 2002

(65) Prior Publication Data

US 2003/0137776 A1 Jul. 24, 2003

Related U.S. Application Data

(60) Provisional application No. 60/352,077, filed on Jan. 24, 2002.

(51) Int. Cl.$^7$ ................................................. G11B 5/54
(52) U.S. Cl. .................................................... 360/264.2
(58) Field of Search ........................... 360/264.2, 264.4, 360/97.01, 266.3, 246

(56) References Cited

U.S. PATENT DOCUMENTS

| | | | |
|---|---|---|---|
| 5,615,068 A | 3/1997 | Matsuda et al. | 360/106 |
| 5,680,277 A | 10/1997 | Bonn et al. | 360/106 |
| 5,717,541 A * | 2/1998 | Ycas et al. | 360/97.01 |
| 5,717,547 A * | 2/1998 | Young | 360/246 |
| 5,745,326 A | 4/1998 | Koriyama | 360/106 |
| 5,818,667 A | 10/1998 | Larson | 360/106 |
| 5,901,020 A | 5/1999 | Koriyama | 360/106 |
| 5,907,452 A * | 5/1999 | Kan | 360/97.01 |
| 5,923,501 A * | 7/1999 | Suzuki et al. | 360/264.2 |
| 5,953,183 A | 9/1999 | Butler et al. | 360/106 |
| 6,166,888 A | 12/2000 | Tsuda et al. | 360/264.2 |
| 6,236,531 B1 | 5/2001 | Allsup et al. | 360/97.01 |
| 6,678,120 B2 * | 1/2004 | Money | 360/264.4 |
| 2001/0005299 A1 * | 6/2001 | Kado et al. | 360/264.2 |
| 2003/0086214 A1 * | 5/2003 | Shin | 360/266.3 |

* cited by examiner

*Primary Examiner*—Tianjie Chen
(74) *Attorney, Agent, or Firm*—Westman, Champlin & Kelly, P.A.

(57) ABSTRACT

The present invention for a disk drive is a damping feature applied to the contact area between the flexible circuit and the pivot housing, reducing the resonance energy transferred from the flexible circuit to the pivot housing. This invention reduces the direct energy transfer from the flexible circuit to the pivot house by applying a damping feature as embodied by damping material on the flexible circuit or pivot housing at the point at which they make contact or by adding a damper to the flexible circuit re-routing tip area between the pivot housing and the flexible circuit. The damping feature absorbs the resonance energy from the flexible circuit to the damping feature material and reduces the energy transferred from the flexible circuit to the pivot housing.

13 Claims, 6 Drawing Sheets

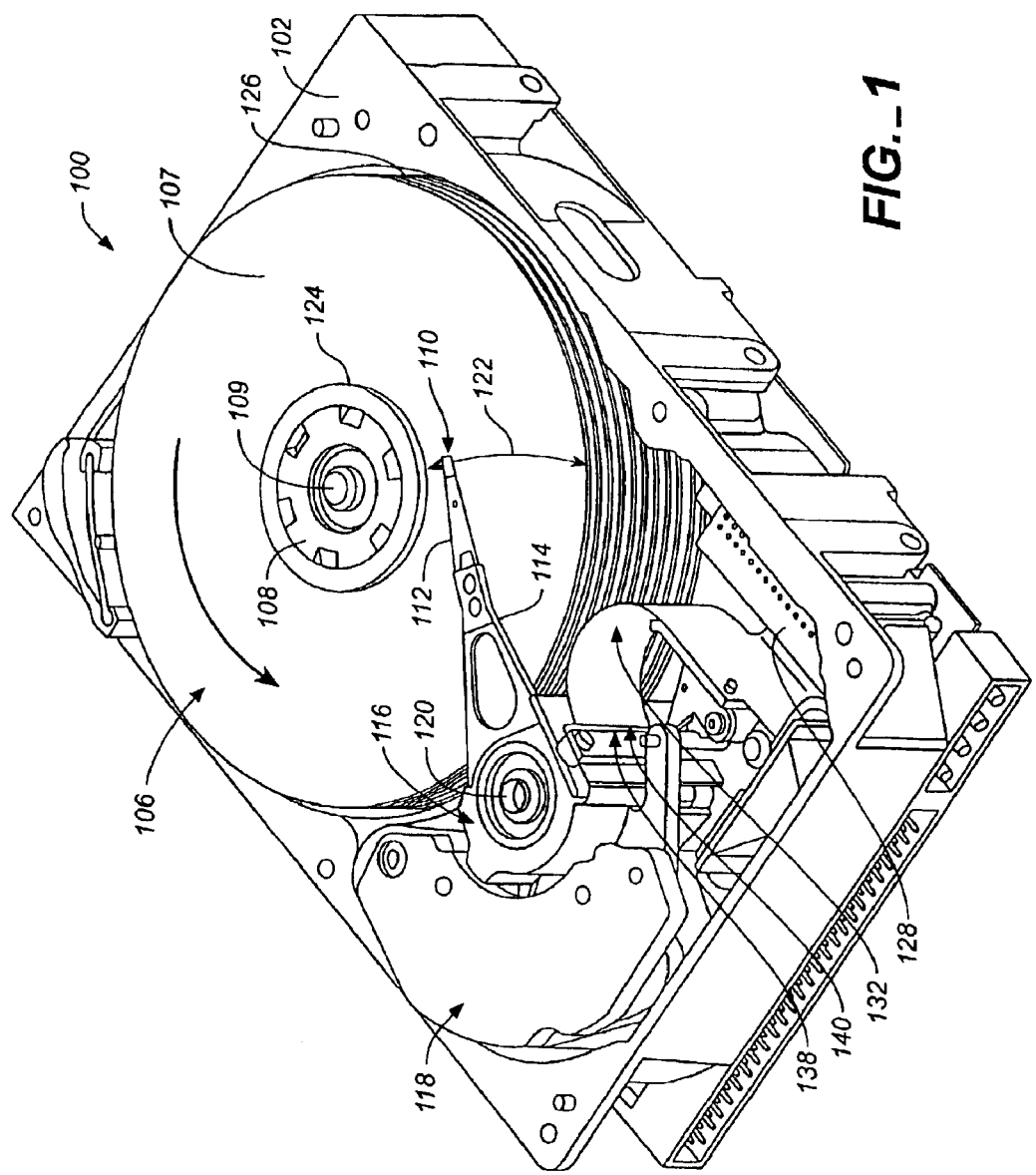
FIG._1

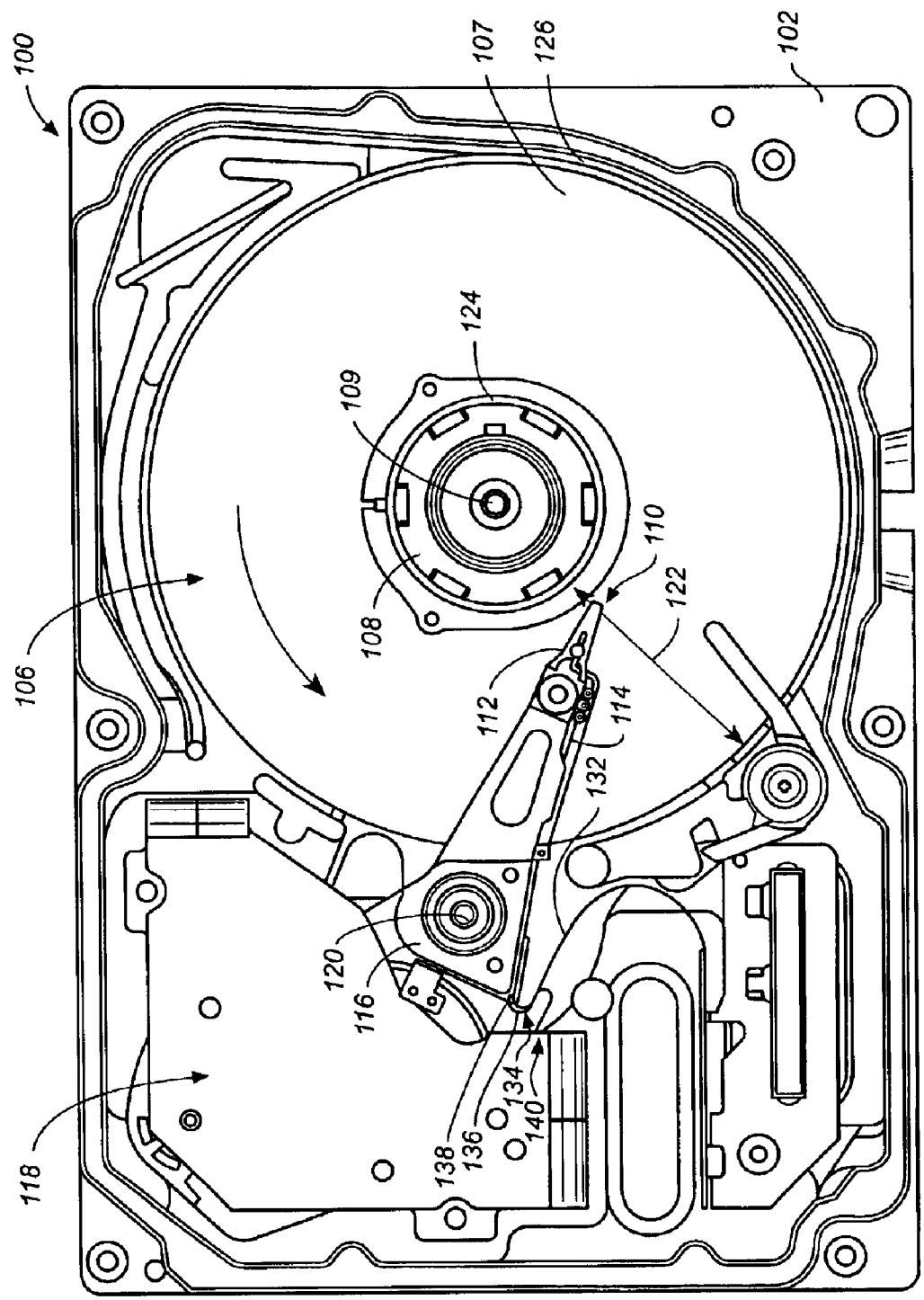
FIG._2

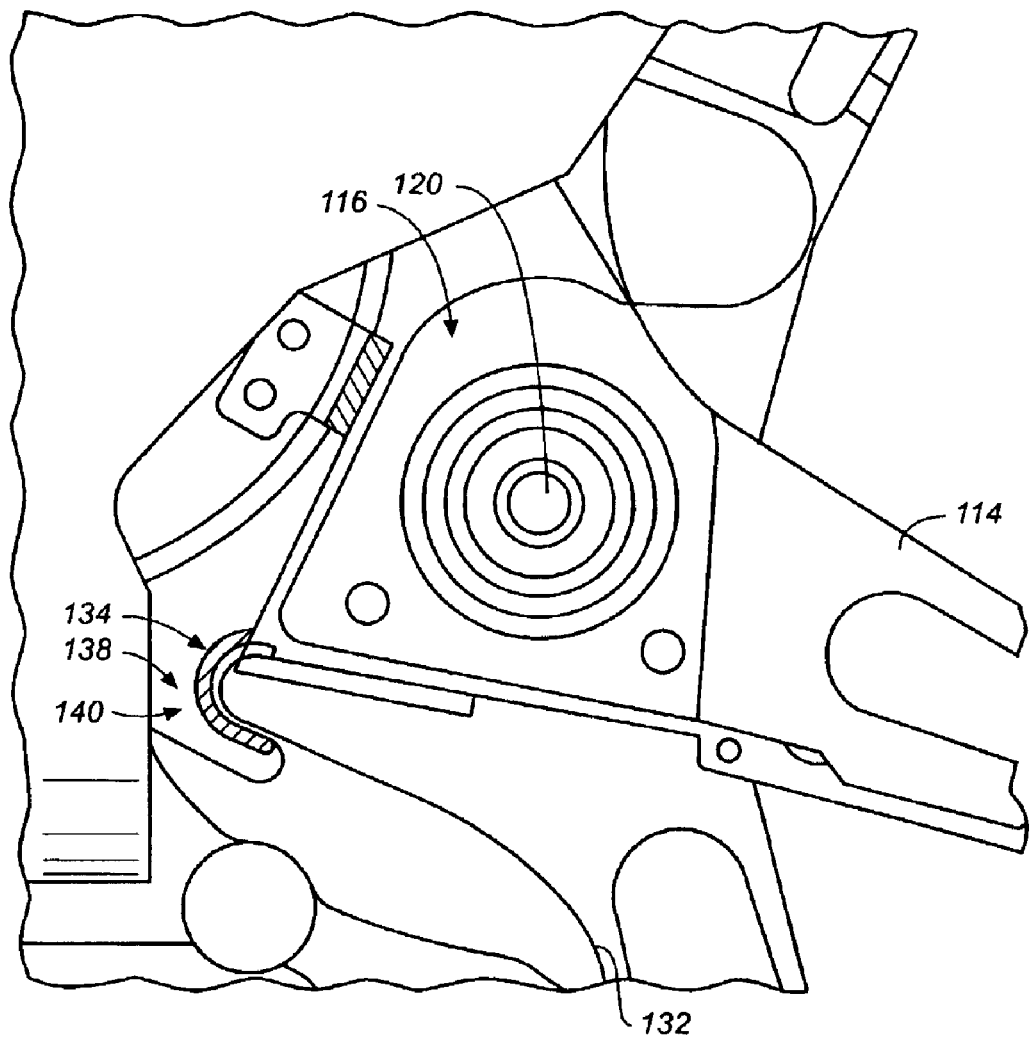
FIG._3

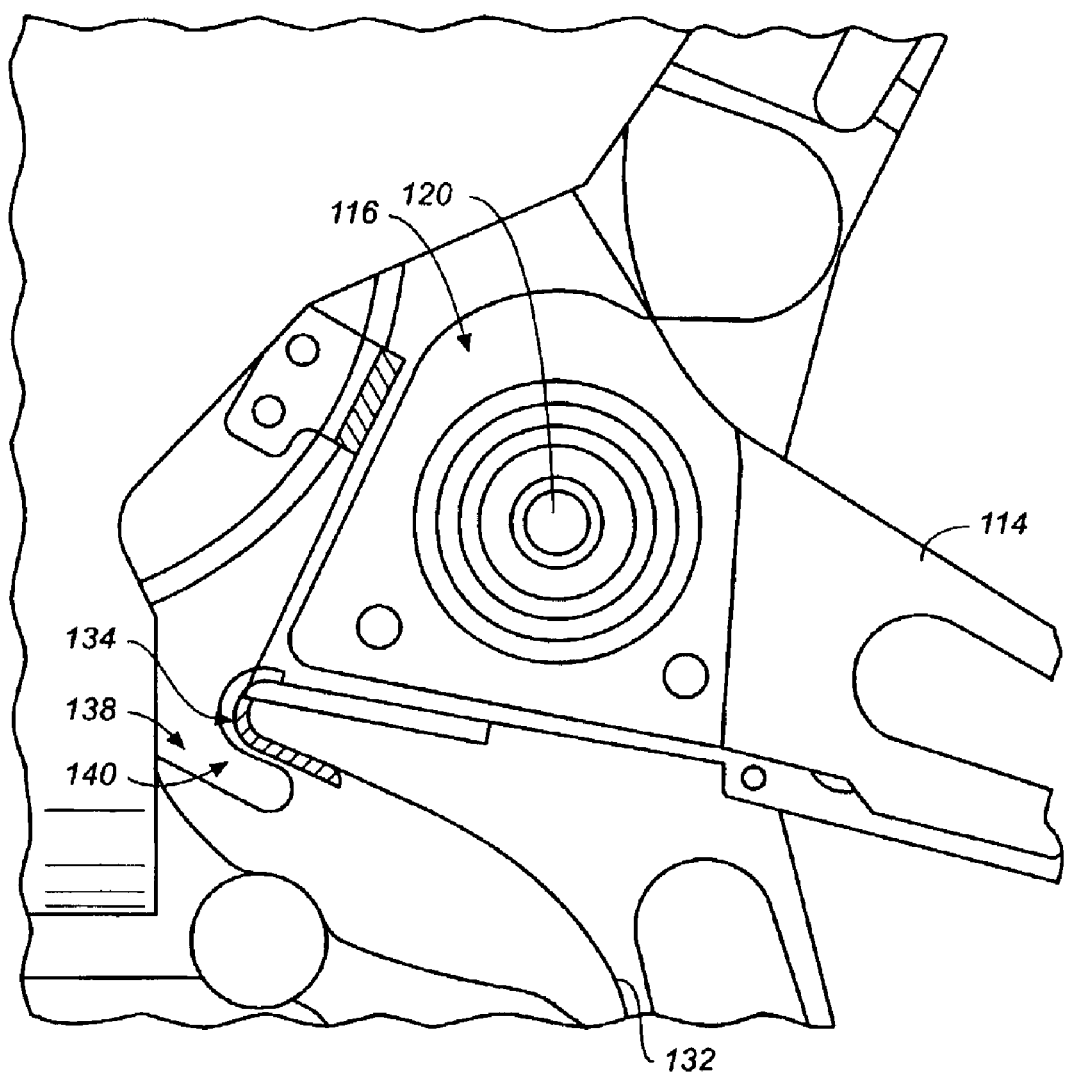
FIG._4

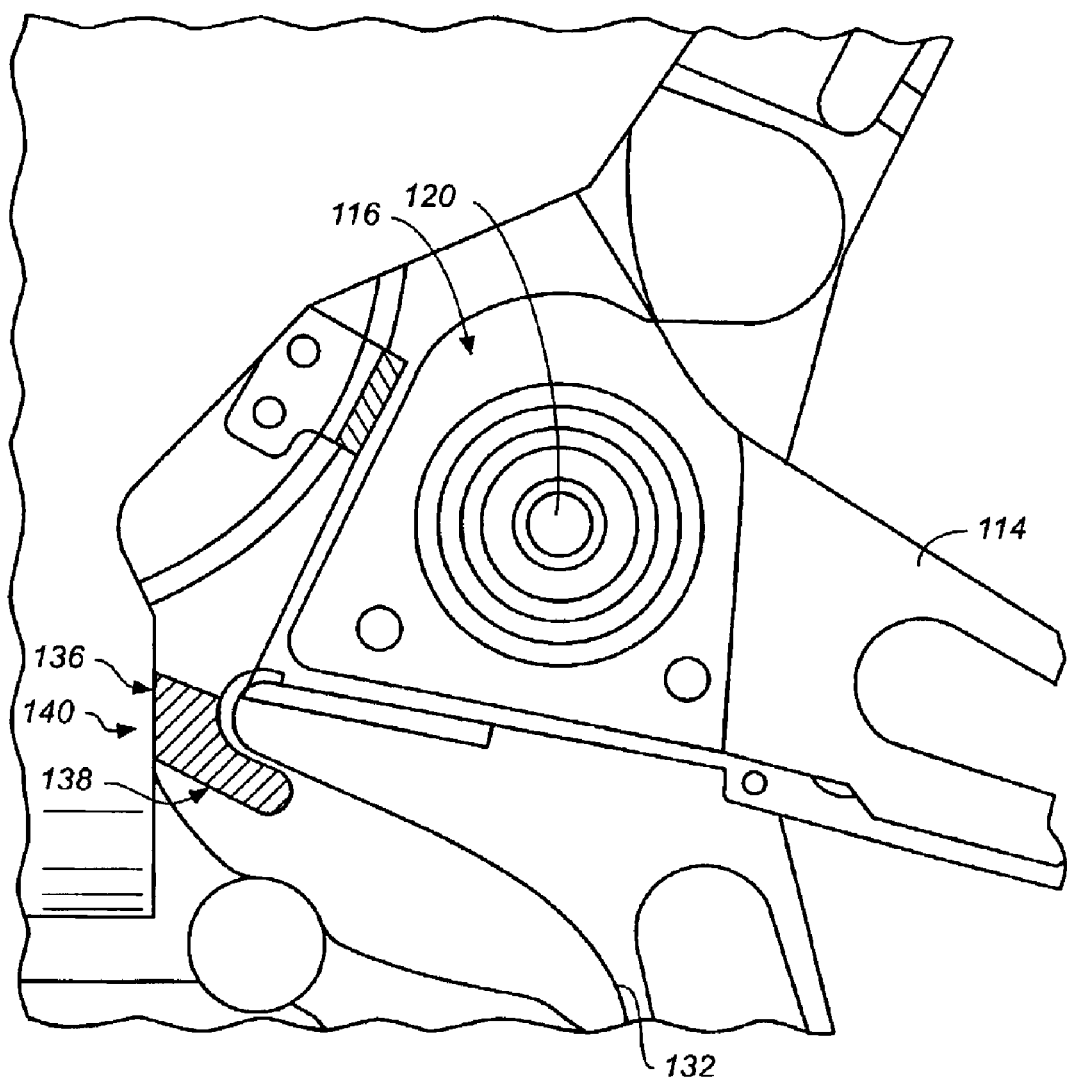
FIG._5

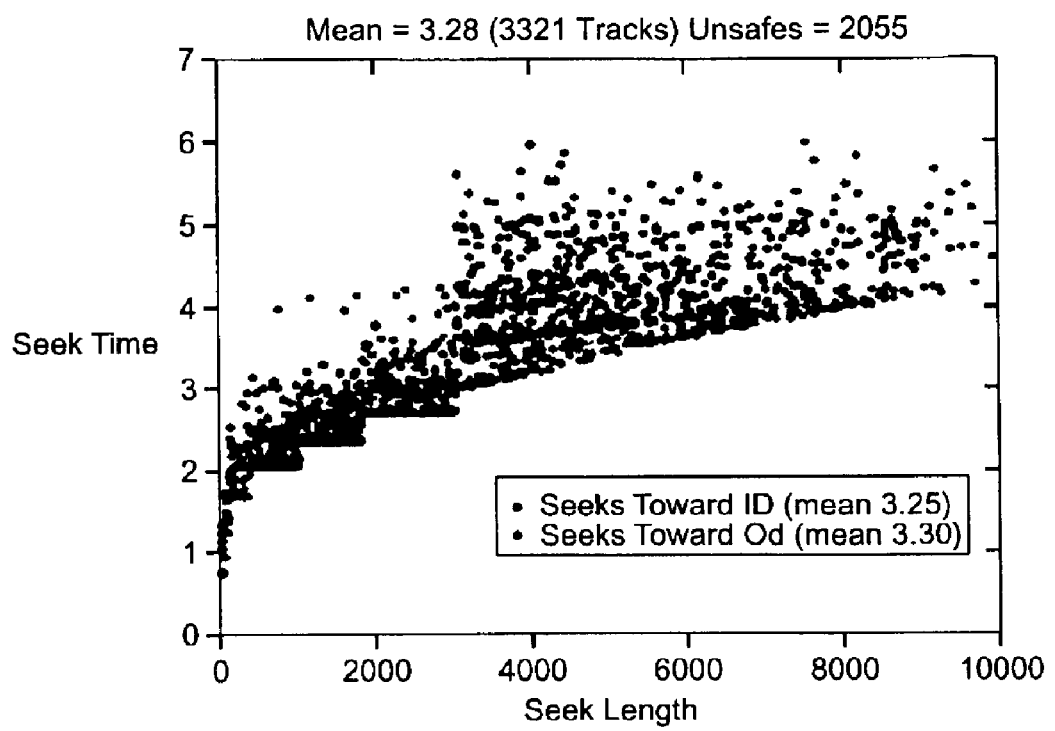
FIG._6
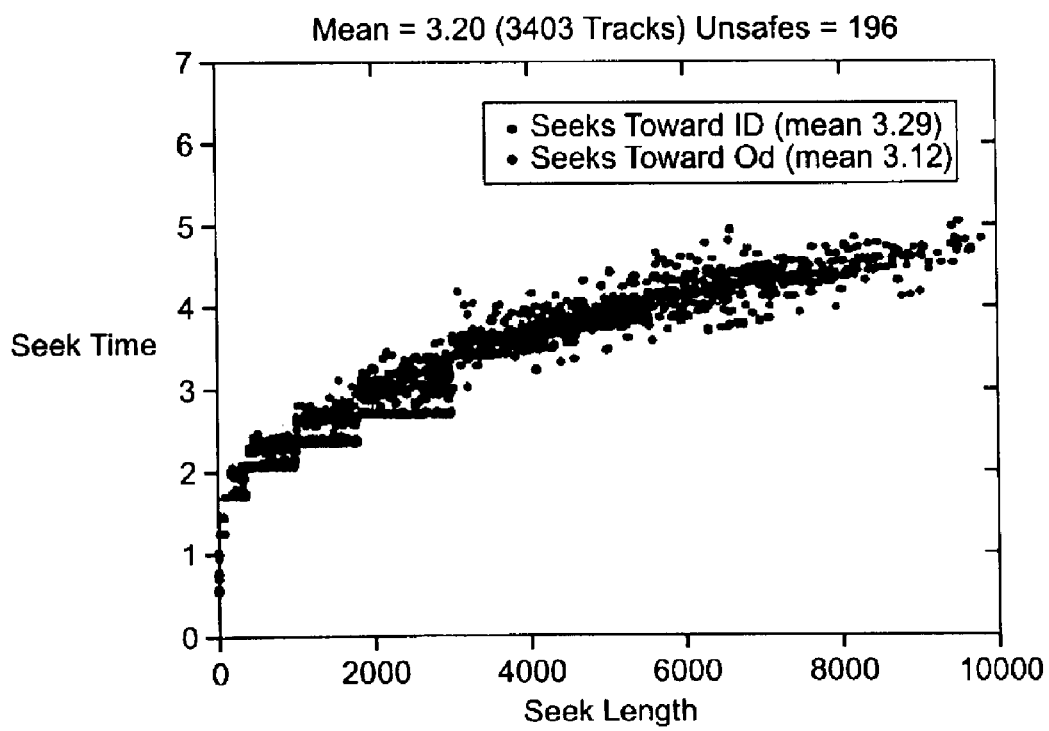
FIG._7

CONTACTING POINT DAMPING METHOD BETWEEN FLEX CIRCUIT AND PIVOT HOUSING

CROSS-REFERENCE TO RELATED APPLICATION

This application claims priority from U.S. Provisional Application 60/352,077 filed on Jan. 24, 2002 for inventors and entitled CONTACTING POINT DAMPING METHOD BETWEEN FLEX CIRCUIT AND PIVOT HOUSING.

FIELD OF THE INVENTION

The present invention relates generally to data storage systems, and more particularly but not by limitation to damping contacting components within data storage systems.

BACKGROUND OF THE INVENTION

Disc drives are common data storage devices. A typical disc drive includes a rigid housing or deck that encloses a variety of disc drive components. The components include one or more discs having data surfaces coated with a magnetizable medium for storage of digital information in a plurality of circular, concentric data tracks. The discs are mounted on a spindle motor that causes the discs to spin and the data surfaces of the discs to pass under respective hydrodynamic or aerodynamic bearing disc head sliders. The sliders carry transducers, which write information to and read information from the data surfaces of the discs.

A flexible circuit, known as a "flex cable" and typically including electrical traces supported by a polymeric carrier material connects the read\write elements on the disc head slider to the arm electronics, which interface the data signal from a host computer with the disc.

A head stack assembly (HSA) in a hard disc drive includes a pivot bearing cartridge, a pivot housing (arm or e-block), a record head gimbal assembly (HGA), an actuator voice coil, the flexible circuit for receiving and sending the electrical signal in and out to the recording head and the actuator, and additional components. The flexible circuit is connected to pivot housing by press-pin and soldering methods. The flexible circuit is re-routed in a 'S' loop shape by a re-routing tip feature on the pivot housing at one end and by a flexible circuit stiffener at the other end.

Flexible circuit resonance has been a common problem in disc drives for generations of products. When a hard disc drive is engaged in a data seeking process, the flexible circuit is moving together with the pivot housing at the connected end. The flexible circuit motion/vibration/ resonance can be large enough to cause functional failure for the drive, e.g. the slider is unable to settle out above the commanded track as rapidly as required. (This is referred to as the seek settle out requirement). As each new generation of hard disc drive demands more recorded tracks per inch (KTPI), fixing or reducing the flex resonance becomes more important.

Known approaches for modifying the flex resonance generally fall into two types. The first approach is to change the geometry of the flexible circuit (longer or shorter length, thinner or thicker flex, etc) to change the natural resonant frequency of the flexible circuit. This type of fix needs to be re-addressed in the product development cycle for each new generation of hard disc drive as the natural frequency of the flexible circuit varies depending on the specific design of the flexible circuit, i.e., length, thickness, etc. The second approach is to add damping material on the moving part (loop area) of the flexible circuit to absorb the energy. This approach does not control or damp the flex resonance energy transfer at the contacting area between the flexible circuit and pivot housing. When the drive runs a short seek and needs to settle on a track, the flexible circuit may not be able to synchronize with the pivot housing to stop its motion in time. Instead, the inertia force keeps the flexible circuit moving and this extra inertia motion energy transfers directly to the pivot housing, causing the system to fail to meet seek settle out requirements. Consequently, neither approach is entirely satisfactory.

Embodiments of the present invention address these and other problems, and offer other advantages over the prior art.

SUMMARY OF THE INVENTION

The present invention is a damping feature on the contact area between the flexible circuit and the pivot housing, reducing the resonance energy transferred from the flexible circuit to the pivot housing. This invention reduces the direct energy transfer from the flexible circuit to the pivot house by applying a damping feature as embodied by damping material on the flexible circuit or pivot housing at the point at which they make contact or by adding a damper to the flex re-routing tip area in between the pivot housing and the flexible circuit. The damping feature absorbs the resonance energy from the flexible circuit to the damping feature material and reduces the energy transferred from the flexible circuit to the pivot housing.

Other features and benefits that characterize embodiments of the present invention will be apparent upon reading the following detailed description and review of the associated drawings.

BRIEF DESCRIPTION OF THE DRAWINGS

FIG. 1 is an isometric view of a disc drive.

FIG. 2 is a plan view of a disc drive embodying features of the present invention.

FIG. 3 is an enlarged portion of FIG. 2 better illustrating features of the present invention.

FIG. 4 is an enlarged portion of FIG. 2 better illustrating features of the present invention.

FIG. 5 is an enlarged portion of FIG. 2 better illustrating features of the present invention.

FIG. 6 is an example of the seek profile using a disk drive embodying prior art.

FIG. 7 is an example of the seek profile using a disk drive embodying the present invention.

DETAILED DESCRIPTION OF ILLUSTRATIVE EMBODIMENTS

FIG. 1 is an isometric view of a disc drive 100 in which embodiments of the present invention are useful. Disc drive 100 includes a housing with a base 102 and a top cover (not shown). Disc drive 100 further includes a disc pack 106, which is mounted on a spindle motor (not shown) by a disc clamp 108. Disc pack 106 includes a plurality of individual discs 107, which are mounted for co-rotation about central axis 109. Each disc surface has an associated disc head slider 110 which is mounted to disc drive 100 for communication with the disc surface. In the example shown in FIG. 1, sliders 110 are supported by suspensions 112 which are in turn attached to track accessing arms 114 of an actuator 116. The actuator shown in FIG. 1 is of the type known as a rotary moving coil actuator and includes a voice coil motor (VCM), shown generally at 118. Voice coil motor 118 rotates pivot housing 116 with its attached heads 110 about a pivot shaft 120 to position heads 110 over a desired data track along an arcuate path 122 between a disc inner diameter 124 and a disc outer diameter 126. Voice coil motor 118 is driven by servo electronics, also known as controller, 128 based on signals generated by heads 110 and a host computer (not shown). A flexible cable 132 runs between pivot housing 116 and servo electronics 128. Pivot housing 116 has a re-routing tip 138 which engages flexible cable 132 and reroutes flexible cable 132 to better enable it to loop around in a tight loop as shown.

A frequent problem with prior art disc drives is that the pivot housing is actuated at a higher speed than the flexible circuit is able to follow. Consequently, the flexible circuit forcibly contacts, or collides, with the pivot housing, causing a resulting positioning error of the slider. This positioning error leads to a failure of the seek settle out requirement.

FIGS. 2 through 5 are plan views of disc drive 100 embodying features of the present invention. This flexible circuit resonance damping method addresses reducing the resonance energy transferred from the flexible circuit directly to the pivot housing. Disc drive 100 has pivot housing 116, flexible cable 132, and a damper 134 disposed at the first contact area between pivot housing 116 and flexible cable 132. Damper 134 is comprised of a damping material 136 having a greater damping ratio than those of pivot housing 116 and flexible cable 132. In some embodiments, pivot housing 116 has re-routing tip 138 which engages flexible cable 132 and reroutes flexible cable 132 to better enable it to loop around in a tight loop as shown. The flex circuit assembly 140 includes flexible cable 132 and damper 134 (and/or damping material 136).

Damping material 136 may be one of the widely available elastic polymer films. Minnesota Mining & Manufacturing, Inc. of Minneapolis, Minn., USA produces several acceptable films such as 20 mil ISD-142 and 15 mil ISD-112, and others. These visco elastic films are very similar to common double-sided tapes. The present invention does not limit damping material 136 to visco elastic films or elastic polymer films, but simply a material that has a greater damping ratio than pivot housing 116 and flexible cable 132.

In one embodiment, FIG. 3, disc drive 100 has damper 134 disposed on re-routing tip 138 where re-routing tip 138 contacts flexible cable 132. This approach addresses reducing the direct energy transfer from the flex motion to the pivot housing 110 by applying a damping feature directly to existing flex re-routing tip 138 between pivot housing 116 and flexible cable 132. Flex circuit assembly 140 includes flexible cable 132 and damper 134.

In a second embodiment, FIG. 4, disc drive 100 has damper 134 disposed on flexible circuit 132 where flexible cable 132 contacts re-routing tip 138. This approach addresses reducing the direct energy transfer from the flex motion to the pivot housing 110 by applying a damping feature directly to existing flexible cable 132 between pivot housing 116 and flexible cable 132. Flex circuit assembly 140 includes flexible cable 132 and damper 134.

In a third embodiment, FIG. 5, disc drive 100 has re-routing tip comprised of damping material 136. This approach uses damping 136 integrated on the pivot housing 116 to form a flexible re-routing tip 138 and replace the metal re-routing tip 138. This approach addresses reducing the direct energy transfer from the flex motion to the pivot housing 110 by using damping material 136 to form flex re-routing tip 138 between pivot housing 116 and flexible cable 132. This approach differs from the previous two in that a component of disc drive 100, re-routing tip 138, is replaced with a re-routing tip 138 comprised of damping material 136 rather than the existing component simply having damper 134 applied to it. It is believed that this approach works in a similar fashion to re-routing tip 138 covered by damping material 136 as discussed above. Flex circuit assembly 140 includes flexible cable 132 and damping material 136.

FIGS. 6 and 7 plot Seek Length (x-axis), in numbers of tracks, against Seek Time (y-axis), in milliseconds. A study of this embodiment showed a 90% servo unsafe reduction for the same drive, from 2055 to 196. At the same time, the seek time variation is also significantly reduced. For example, a seek conducted across 4000 tracks varies between about three to six milliseconds, for a variation of three milliseconds, in the drive without the present invention. The same drive incorporating the present invention reduces the variation to only one millisecond, from about three to four milliseconds. Consequently, the seek times are more repeatable and shorter in a drive incorporating the present invention. This damping method virtually eliminates the influence of the flexible circuit resonance on the actuator track following performance.

The present invention can be described as follows with reference to the figures. In some embodiments a disc drive (such as 100) comprises a disc (such as 106), a data head (such as 110) operably located relative to the disc (such as 107), a pivot housing (such as 116) configured for positioning the head (such as 110) relative to the disc (such as 107), a controller (such as 128), and a flex circuit assembly (such as 140) configured for carrying electrical signals between the head (such as 110) and the controller (such as 128) wherein the flex circuit assembly (such as 140) comprises a flexible cable (such as 132), and a damper (such as 134) disposed between the pivot housing (such as 116) and the flexible cable (such as 132).

Some embodiments further include that the disc drive (such as 100) has the damper (such as 134) comprising a damping material (such as 136) having a greater damping ratio than that of the pivot housing (such as 116) and the flexible cable (such as 132).

Some embodiments further include that the disc drive (such as 100) has the pivot housing (such as 116) comprised of a re-routing tip (such as 138).

Some embodiments further include that the disc drive (such as 100) has the damping material (such as 136) comprising of an elastic polymer film.

An embodiment further includes that the disc drive (such as 100) has the damper (such as 134) disposed on the re-routing tip where the re-routing tip (such as 138) contacts the flexible cable (such as 132).

An embodiment further includes that the disc drive (such as 100) has the damper (such as 134) disposed on the flexible cable (such as 132) where the flexible cable (such as 132) contacts the re-routing tip (such as 138).

Some embodiments further include that the disc drive (such as 100) has the re-routing tip (such as 138) comprising a damping material (such as 136).

In some embodiments a support assembly for supporting a head carrying slider (such as 110) has the support assembly comprising a pivot housing (such as 116), a flexible cable (such as 132), and a damper (such as 134) disposed between the pivot housing (such as 116) and the flexible cable (such as 132).

Some embodiments further include that the support assembly has the damper (such as 134) comprising a damping material (such as 136) having a greater damping ratio than those of the pivot housing (such as 116) and the flexible cable (such as 132).

Some embodiments further include that the support assembly has the pivot housing (such as 116) comprising a re-routing tip (such as 138).

Some embodiments further include that the support assembly has the damping material (such as 136) comprising of an elastic polymer film.

An embodiment further includes that the support assembly has the damper (such as 134) disposed on the re-routing tip (such as 138) where the re-routing tip contacts the flexible cable (such as 132).

An embodiment further includes that the support assembly has the damper (such as 134) disposed on the flexible cable (such as 132) where the flexible cable (such as 132) contacts the re-routing tip (such as 138).

Some embodiments further include that the support assembly has the re-routing tip (such as 138) comprising a damping material (such as 136).

In some embodiments a disc drive (such as 100), comprises a pivot housing (such as 116), a flexible cable (such as 132), and means for damping energy passed by direct contact between the pivot housing and the flexible circuit.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the memory storage system while maintaining substantially the same functionality without departing from the scope and spirit of the present invention. In addition, although the preferred embodiment described herein is directed to a memory storage system for a magnetic disc drive, it will be appreciated by those skilled in the art that the teachings of the present invention can be applied to optical drive, without departing from the scope and spirit of the present invention.

What is claimed is:

1. A disc drive comprising:
   a disc;
   a data head operably located relative to die disc;
   a pivot housing configured for positioning the head relative to the disc;
   a controller; and
   a flex circuit assembly, carrying electrical signals between the head and the controller wherein the flex circuit comprises:
   a flexible cable extending along an arc from the pivot housing towards the controller; and
   a damper disposed outside the arc of the flexible cable and between the pivot housing and the flexible cable.

2. The disc drive of claim 1, wherein the damper comprises a damping material having a greater damping ratio than that of the pivot housing and the flexible circuit.

3. The disc drive of claim 2, wherein the damping material comprises elastic polymer film.

4. The disc drive of claim 3, wherein the damper is disposed on a re-routing tip where the re-routing tip contacts the flexible circuit.

5. The disc drive of claim 3, wherein the damper is disposed on the flexible circuit where the flexible circuit contacts a re-routing tip.

6. The disc drive of claim 1, wherein a re-routing tip comprises a damping material.

7. A support assembly for supporting a head carrying slider relative to a disc in a disc drive, the support assembly comprising:
   a pivot housing;
   a flexible circuit extending in an arc from the pivot housing towards the controller; and
   a damper disposed outside the arc between the pivot housing and the flexible circuit of the flexible cable end.

8. The support assembly of claim 7, wherein the damper comprises a damping material having a greater damping ratio than those of the pivot housing and the flexible circuit.

9. The support assembly of claim 8, wherein the damping material comprises an elastic polymer film.

10. The support assembly of claim 9, wherein the damper is disposed on a re-routing tip where the re-routing tip contacts the flexible circuit.

11. The support assembly of claim 9, wherein the damper is disposed on the flexible circuit where the flexible circuit contacts a re-routing tip.

12. The support assembly of claim 7, wherein a re-routing tip comprises damping material.

13. A disc drive, comprising:
   a pivot housing including a re-routing tip;
   a flexible circuit extending in an arc along the re-routing tip from the pivot housing towards the controller; and
   means for damping energy passed by direct contact between the pivot housing and the flexible circuit, the means disposed outside the arc between the pivot housing and the flexible circuit.

* * * * *